(12) United States Patent
Cui et al.

(10) Patent No.: US 11,308,739 B2
(45) Date of Patent: Apr. 19, 2022

(54) AUTOMATIC DRIVING SYSTEM, VEHICLE CONTROL METHOD AND DEVICE

(71) Applicant: Apollo Intelligent Driving Technology (Beijing) Co., Ltd., Beijing (CN)

(72) Inventors: Yue Cui, Beijing (CN); Yaling Zhang, Beijing (CN); Ji Tao, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 212 days.

(21) Appl. No.: 16/511,502

(22) Filed: Jul. 15, 2019

(65) Prior Publication Data

US 2020/0082648 A1 Mar. 12, 2020

(30) Foreign Application Priority Data

Sep. 7, 2018 (CN) .......................... 201811042244.0

(51) Int. Cl.
*G07C 5/08* (2006.01)
*G07C 5/02* (2006.01)
*B60R 16/023* (2006.01)

(52) U.S. Cl.
CPC ............. *G07C 5/0808* (2013.01); *G07C 5/02* (2013.01); *B60R 16/023* (2013.01)

(58) Field of Classification Search
CPC ...... G07C 5/0808; G07C 5/02; B60R 16/023; G06F 11/27; G06F 11/3013;
(Continued)

(56) References Cited

U.S. PATENT DOCUMENTS 4,654,846 A * 3/1987 Goodwin ............. G05D 1/0077
700/82
5,107,425 A 4/1992 Donges et al.
(Continued)

FOREIGN PATENT DOCUMENTS

CN 103634166 A 3/2014
CN 104417394 A 3/2015
(Continued)

OTHER PUBLICATIONS

Extended European Search Report for European Patent Application No. 19187253.0, dated Jul. 24, 2020.

*Primary Examiner* — Michael V Kerrigan
(74) *Attorney, Agent, or Firm* — Harness, Dickey & Pierce, P.L.C.

(57) ABSTRACT

The disclosure provides an automatic driving system, a vehicle control method and a device. The automatic driving system includes a main monitoring equipment, a secondary monitoring equipment, at least one equipment to be detected, and a standby equipment corresponding to each equipment to be detected; the primary monitoring equipment and the secondary monitoring equipment are connected to each equipment to be detected and the standby equipment corresponding to each equipment to be detected; the primary monitoring equipment is connected to the secondary monitoring equipment. The above system and control method ensure that an equipment of the vehicle is is abnormal, the vehicle can be switched to a standby equipment of the equipment in time, which greatly reduces an incidence of a safety accident caused by a failure of the equipment.

20 Claims, 5 Drawing Sheets

(58) Field of Classification Search
CPC ............. G06F 11/3058; G06F 11/0751; G06F 11/2028; B60W 2050/0292; B60W 50/023; B60W 2050/0295; B60W 50/04; B60W 50/08; B60W 60/00186
See application file for complete search history.

(56) References Cited

U.S. PATENT DOCUMENTS

| | | |
|---|---|---|
| 2016/0103450 A1 | 4/2016 | Hogenmueller et al. |
| 2018/0107212 A1 | 4/2018 | Baumgaertner |

FOREIGN PATENT DOCUMENTS

| | | | |
|---|---|---|---|
| CN | 105346483 A | 2/2016 | |
| CN | 105556775 A | 5/2016 | |
| CN | 106354141 A | 1/2017 | |
| CN | 107187465 A | 9/2017 | |
| CN | 206713129 U | 12/2017 | |
| CN | 107908186 A | 4/2018 | |
| CN | 107953890 A | 4/2018 | |
| CN | 108068818 A | 5/2018 | |
| CN | 108344580 A | 7/2018 | |
| DE | 102013020177 A1 | 6/2014 | |
| JP | H11223578 A | 8/1999 | |
| JP | 2018067312 A | 4/2018 | |
| JP | 2018081080 A | 5/2018 | |

* cited by examiner

AUTOMATIC DRIVING SYSTEM, VEHICLE CONTROL METHOD AND DEVICE

CROSS-REFERENCE TO RELATED APPLICATION

This application claims priority to Chinese Patent Application No. 201811042244.0, filed on Sep. 7, 2018, which is hereby incorporated by reference in its entirety.

TECHNICAL FIELD

Embodiments of the present disclosure relate to the field of automatic driving technologies, and particularly to an automatic driving system, a vehicle control method and a device.

BACKGROUND

Automatic driving vehicles can improve road safety and provide people with a new way of mobile travel, making people's lives more convenient. Whether commuting to and from work, remote self-driving tour, or order delivery, fully automatic driving vehicles have great potential.

An automatic driving vehicle, also known as a driverless vehicle, a computer-driven vehicle, or a wheeled mobile robot, is a smart car that can realize self-driving by a computer system, mainly relying on artificial intelligence, visual computing, radar, monitoring equipment and global positioning system to work together, and allowing a computer to operate a motor vehicle automatically and safely without any human active operation. The safety of the automatic driving vehicle and the control efficiency of the automatic driving vehicle are the most critical indicators of the automatic driving vehicle.

At present, there are various faults and instability phenomena in the iterative research and development of the automatic driving system, the potential failure risk of these vehicles will directly lead to abnormal vehicle behavior, even collision damage, which will bring great safety risks to the commissioning personnel and equipment property of the vehicle.

SUMMARY

The present disclosure provides an automatic driving system, a vehicle control method and device, which ensure that when an equipment of the vehicle is abnormal, the vehicle is switched to a standby equipment of the equipment in time, which greatly reduces an incidence of a safety accident caused by a failure of the equipment of the system.

A first aspect of the present disclosure provides an automatic driving system, including: a primary monitoring equipment, a secondary monitoring equipment, at least one equipment to be detected, and a standby equipment corresponding to each equipment to be detected;

the primary monitoring equipment and the secondary monitoring equipment are connected to each equipment to be detected, and the primary monitoring equipment and the secondary monitoring equipment are connected to the standby equipment corresponding to each equipment to be detected;

the primary monitoring equipment is connected to the secondary monitoring equipment, the primary monitoring equipment and the secondary monitoring equipment are configured to perform a fault detection on each equipment to be detected and each standby equipment, and control the vehicle to switch between the equipment to be detected and the standby equipment corresponding to the equipment to be detected.

Optionally, the at least one equipment to be detected includes at least one of: a vehicle motion equipment, an environment sensing equipment, a vehicle control equipment, or a power equipment.

Optionally, the vehicle motion equipment includes at least one of: a speed sensor, an angle sensor, and an integrated navigation equipment.

Optionally, the environment sensing equipment includes at least one of: a lidar sensor, a millimeter wave radar sensor, an ultrasonic sensor, and a camera.

Optionally, the vehicle control equipment includes at least one of: a brake equipment, a steering equipment, an engine, and a gearbox.

A second aspect of the present disclosure provides a vehicle control method, the method is applied to any one of the automatic driving systems in the first aspect of the present disclosure, the method includes:

determining, by a primary monitoring equipment, a detection result of a first equipment to be detected; and if the detection result indicates that the first equipment to be detected is abnormal, controlling, by the primary monitoring equipment, the vehicle to switch to a standby equipment of the first equipment to be detected to operate.

Optionally, the determining, by a primary monitoring equipment, a detection result of a first equipment to be detected, includes:

performing, by the primary monitoring equipment, an abnormal detection on the first equipment to be detected, to obtain the detection result.

Optionally, the determining, by a primary monitoring equipment, a detection result of a first equipment to be detected, includes:

performing, by the primary monitoring equipment, an abnormal detection on the first equipment to be detected, to obtain a first detection result;

obtaining, by the primary monitoring equipment, a second detection result of the first equipment to be detected from the secondary monitoring equipment; and determining, by the primary monitoring equipment, the detection result according to the first detection result and the second detection result.

Optionally, the method further includes:

if the detection result indicates that the first equipment to be detected is abnormal, sending, by the primary monitoring equipment, a fault detection instruction to the first equipment to be detected, wherein the fault detection instruction is used to instruct the first equipment to be detected to perform a self-test; and receiving, by the primary monitoring equipment, a self-test result fed back by the first equipment to be detected, and updates the detection result according to the self-test result.

Optionally, the determining, by the primary monitoring equipment, the detection result according to the first detection result and the second detection result, includes:

if the first detection result indicates that the first equipment to be detected is abnormal, and the second detection result indicates that the first equipment to be detected is abnormal, determining that the first equipment to be detected is abnormal; and if the first detection result indicates that the first equipment to be detected is abnormal, and the second detection result indicates that the first equipment to be detected is normal, determining that the first equipment to be detected is normal.

Optionally, the controlling, by the primary monitoring equipment, the vehicle to switch to a standby equipment of the first equipment to be detected to operate, includes:

sending, by the primary monitoring equipment, a startup command to the standby equipment of the first equipment to be detected, to control the standby equipment to start.

Optionally, the detection result includes at least one of an operating parameter, a connection state, a storage state, and a log sequence of the first equipment to be detected.

Optionally, the method further includes:

receiving, by the primary monitoring equipment, fault cancellation information sent by the first equipment to be detected; and controlling, by the primary monitoring equipment, the vehicle to switch to the first equipment to be detected to operate according to the fault cancellation information.

A third aspect of the present disclosure provides a vehicle control device including:

a determining module configured to determine a detection result of a first equipment to be detected; and an executing module configured to control the vehicle to switch to a standby equipment of the first equipment to be detected to operate when the detection result indicates that the first equipment to be detected is abnormal.

Optionally, the determining module is specifically configured to perform an abnormal detection on the first equipment to be detected to obtain the detection result.

Optionally, the device also includes:

an obtaining module configured to perform an abnormal detection on the first equipment to be detected, to obtain a first detection result;

the obtaining module is further configured to obtain from the secondary monitoring equipment a second detection result obtained by detecting the first equipment to be detected;

the determining module is specifically configured to determine the detection result according to the first detection result and the second detection result.

Optionally, the device also includes:

a sending module configured to send a fault detection instruction to the first equipment to be detected when the detection result indicates that the first equipment to be detected is abnormal, wherein the fault detection instruction is used to instruct the first equipment to be detected to perform a self-test; and a receiving module configured to receive a self-test result fed back by the first equipment to be detected, wherein the determining module is further configured to update the detection result according to the self-test result.

Optionally, the determining module is specifically configured to:

if the first detection result indicates that the first equipment to be detected is abnormal, and the second detection result indicates that the first equipment to be detected is abnormal, determine that the first equipment to be detected is abnormal; and if the first detection result indicates that the first equipment to be detected is abnormal, and the second detection result indicates that the first equipment to be detected is normal, determine that the first equipment to be detected is normal.

Optionally, the executing module is specifically configured to:

send a startup instruction to the standby equipment of the first equipment to be detected, and control the standby equipment to start.

Optionally, the detection result includes at least one of an operating parameter, a connection state, a storage state, and a log sequence of the first equipment to be detected.

Optionally, the device further includes:

a receiving module configured to receive fault cancellation information sent by the first equipment to be detected;

the executing module is further configured to control the vehicle to switch to the first equipment to be detected to operate according to the fault cancellation information.

A fourth aspect of the present disclosure provides a vehicle control device including:

a memory;

a processor; and a computer program;

wherein the computer program is stored in the memory and is configured to be executed by the processor to implement any one of the methods in the second aspect of the present disclosure.

A fifth aspect of the disclosure provides a computer readable storage medium, storing a computer program, which, when being executed by a processor, implements any one of the methods in the second aspect of the present disclosure.

In the automatic driving system, the vehicle control method and the device provided by embodiments of the present disclosure, the automatic driving system includes a main monitoring equipment, a secondary monitoring equipment, at least one equipment to be detected, and a standby equipment corresponding to each equipment to be detected, wherein the primary monitoring equipment and the secondary monitoring equipment are connected to each equipment to be detected and the standby equipment corresponding to each equipment to be detected, and the primary monitoring equipment is connected to the secondary monitoring equipment; and the control method based on the above system includes determining a detection result of the first equipment to be detected by the primary monitoring equipment, and if the detection result indicates that the first equipment to be detected is abnormal, controlling the vehicle to switch to the standby equipment of the first equipment to be detected to operate. The above system and control method ensure that when an equipment of the vehicle is abnormal, the vehicle can be switched to a standby equipment of the equipment in time, which greatly reduces an incidence of a safety accident caused by a failure of the equipment in the system.

DETAILED DESCRIPTION OF THE EMBODIMENTS

Exemplary embodiments will be described in detail herein, examples of which are illustrated in the accompanying drawings. When the following description relates to the drawings, the same numbers in different drawings represent the same or similar elements, unless otherwise indicated. The embodiments described in the following exemplary embodiments do not represent all embodiments consistent with the present disclosure. Instead, they are merely examples of devices and methods consistent with some aspects of the present disclosure, as detailed in the appended claims.

Terms in the specification and claims of the present disclosure "including" and "having", and any variations thereof, are intended to cover a non-exclusive inclusion. For example, a process, method, system, product, or device that includes a series of steps or units is not limited to the listed steps or units, but optionally also includes steps or units not listed, or, optionally also includes other steps or units inherent in the process, method, product or device.

The "an embodiment" or "another embodiment" referred to throughout the specification of the present disclosure means that a particular feature, structure or characteristic related to the embodiment is included in at least one embodiment of the present application. Thus, "In this embodiment" or "in some embodiments", which appears throughout the specification, does not necessarily refer to the same embodiment. It should be noted that the embodiments in the present disclosure and the features in the embodiments may be combined with each other without conflict.

The automatic driving system provided by the embodiments of the present disclosure includes simultaneously performing a fault detection on an equipment to be detected on a vehicle by a primary monitoring equipment and a secondary monitoring equipment, and controlling the vehicle to switch between the equipment to be detected and a standby equipment corresponding to the equipment to be detected if it is determined that the equipment to be detected is abnormal. Through the system and the control method above, it is ensured that the system automatically switches to the standby equipment in the event of equipment failure, thereby avoiding the problem that the operation of the system is immediately invalid due to the equipment failure, and improving the safety of the automatic driving system.

The technical solution of the present disclosure will be described in detail below with reference to specific embodiments. The following specific embodiments may be combined with each other, and the same or similar concepts or processes may not be repeatedly described in some embodiments.

Figure 1:
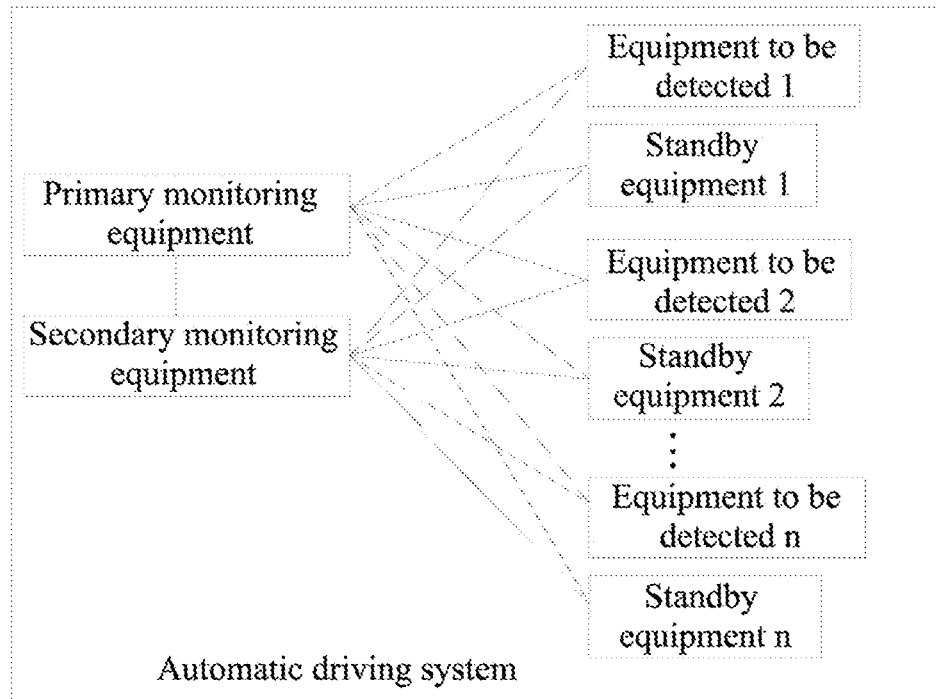
FIG. 1 is a schematic structural diagram of an automatic driving system according to an embodiment of the present disclosure.

FIG. 1 is a schematic structural diagram of an automatic driving system according to an embodiment of the present disclosure. As shown in FIG. 1, the automatic driving system provided in this embodiment includes:

a primary monitoring equipment, a secondary monitoring equipment, at least one equipment to be detected, and a standby equipment corresponding to each equipment to be detected;

the primary monitoring equipment and the secondary monitoring equipment are connected to each equipment to be detected, and the primary monitoring equipment and the secondary monitoring equipment are connected with the standby equipment correspond to each equipment to be detected;

the primary monitoring equipment is connected to the secondary monitoring equipment, the primary monitoring equipment and the secondary monitoring equipment are configured to perform a fault detection on each equipment to be detected and each standby equipment, and control the vehicle to switch between the equipment to be detected and the standby equipment corresponding to the equipment to be detected.

FIG. 1 shows n equipments to be detected and n standby equipments corresponding to n equipments to be detected, wherein, n is an integer greater than or equal to 1.

In this embodiment, the primary monitoring equipment includes a first information processing unit and a first communication unit, the first information processing unit is connected to each equipment to be detected, a standby equipment corresponding to each equipment to be detected and the first communication unit, wherein, the first information processing unit is configured to obtain equipment information of each equipment to be detected, and determine whether the equipment to be detected is abnormal according to the equipment information, and the first information processing unit is further configured to obtain equipment information of each equipment to be detected sent by the secondary monitoring equipment, and determine whether the equipment to be detected is abnormal after the data information is synchronized; and the first communication unit is configured to send a control instruction to each equipment to be detected and the standby equipment corresponding to the equipment to be detected.

Correspondingly, the secondary monitoring equipment includes a second information processing unit and a second communication unit, the second information processing unit is connected to each equipment to be detected, a standby equipment corresponding to each equipment to be detected, and the second communication unit, the second communication unit is connected to the first communication unit in the primary monitoring equipment, wherein, the second information processing unit is configured to obtain equipment information of each equipment to be detected, and determine whether the equipment to be detected is abnormal according to the equipment information, and the second communication unit is configured to send equipment information of each equipment to be detected to the first communication unit of the primary monitoring equipment.

In this embodiment, the first information processing unit of the primary monitoring equipment can make a determination according to the equipment information of each equipment to be detected that is obtained by itself, and can also perform a comprehensive evaluation according to the equipment information of each equipment to be detected sent by the secondary monitoring equipment. This embodiment does not specifically limit this.

Optionally, the second communication unit is further configured to send a control instruction to each equipment to be detected and the standby equipment corresponding to the equipment to be detected. Specifically, when the primary monitoring equipment fails, the secondary monitoring equipment makes a determination by the second information processing unit on the basis of the equipment information of each equipment to be detected obtained by the second information processing unit itself, and sends a control instruction to each equipment to be detected and the standby equipment corresponding to the equipment to be detected by the second communication unit.

In this embodiment, the equipment information of the equipment to be detected includes, but is not limited to, an operating parameter, a connection state, a storage state, and a log sequence of the equipment.

The equipment to be detected includes at least one of the following: a vehicle motion equipment, an environment sensing equipment, a vehicle control equipment, or a power equipment.

Wherein, the vehicle motion equipment includes at least one of the following: a speed sensor, an angle sensor, and an integrated navigation equipment. The speed sensor and the angle sensor provide relevant transversal and longitudinal information of a line control system of the vehicle; the integrated navigation equipment includes an inertial navigation device and a global positioning system, and provides full attitude information parameters and high precision positioning information.

The environment sensing equipment, that is, the environment sensing sensor, is a sensor responsible for environment sensing and similar to human vision and hearing, and without the support of the environment sensing sensor, the automatic driving function will not be realized. The environment sensing equipment includes at least one of the following: a lidar sensor, a millimeter wave radar sensor, an ultrasonic sensor, and a camera. The data obtained by such as lidar, camera, and millimeter wave radar is fused and provided to a calculation unit for algorithm processing.

The vehicle control equipment includes at least one of the following: a brake equipment, a steering equipment, an engine, and a gearbox. The automatic driving system controls the brake equipment, steering equipment, engine and gearbox of the vehicle through electric signals to realize functions such as adaptive cruising, emergency braking and automatic parking.

Optionally, in some embodiments, the primary monitoring equipment includes a plurality of first information processing units, and the secondary monitoring equipment includes a plurality of second information processing units. Different first information processing units are configured to process the equipment information of different equipments to be detected, and determine the detection result of each equipment to be detected; and different second information processing units are configured to process the equipment information of different equipments to be detected, and determine the detection result of each equipment to be detected.

When a certain first information processing unit of the primary monitoring equipment is faulty, the primary monitoring equipment may determine whether to switch the vehicle to the standby equipment of the equipment to be detected according to the detection result of the equipment to be detected determined by a corresponding second information processing unit in the secondary monitoring equipment. Alternatively, the detection result is directly determined by the secondary monitoring equipment to determine whether to switch the vehicle to the standby equipment of the equipment to be detected.

Optionally, in some embodiments, the plurality of second information processing units of the secondary monitoring equipment are only used to detect an important equipment to be detected on the vehicle, in other words, the number of second information processing units of the secondary monitoring equipment is smaller than the number of first information processing units of the primary monitoring equipment.

The automatic driving system provided by the embodiment of the present disclosure includes a primary monitoring equipment, a secondary monitoring equipment, at least one equipment to be detected, and a standby equipment corresponding to each equipment to be detected, wherein the primary monitoring equipment and the secondary monitoring equipment are connected to each equipment to be detected and the standby equipment corresponding to each equipment to be detected, the primary monitoring equipment is connected to the secondary monitoring equipment, and the primary monitoring equipment and the secondary monitoring equipment are configured to perform a fault detection on each equipment to be detected and each standby equipment, and control the vehicle to switch between the equipment to be detected and the standby equipment corresponding to the equipment to be detected. Through the above system, it is ensured that when an important equipment of the vehicle is abnormal, the vehicle can be switched to a standby equipment in time, which greatly reduces an incidence of a safety accident caused by a failure of the equipment.

Based on the automatic driving system of the above embodiment, the vehicle control method provided by an embodiment of the present disclosure will be described in detail below with reference to an accompanying drawing.

Figure 2:
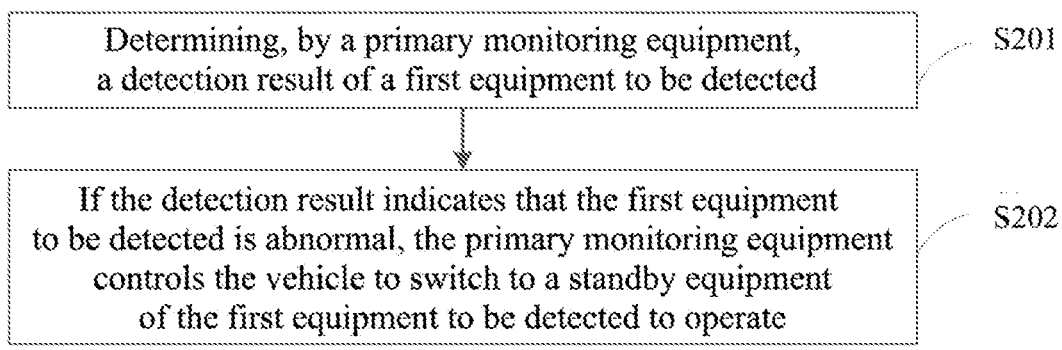
FIG. 2 is a schematic flow chart of a vehicle control method according to an embodiment of the present disclosure.

FIG. 2 is a schematic flow chart of a vehicle control method according to an embodiment of the present disclosure, the method can be performed by any device for performing the vehicle control method, and the device can be implemented in software and/or hardware.

As shown in FIG. 2, the vehicle control method provided in this embodiment includes the following steps:

S201: determining, by a primary monitoring equipment, a detection result of a first equipment to be detected;

In this embodiment, the primary monitoring equipment determines the detection result of the first equipment to be detected, wherein the detection result includes at least one of an operating parameter, a connection state, a storage state, and a log sequence of the first equipment to be detected.

The first equipment to be detected is one of a vehicle motion equipment, an environment sensing equipment, a vehicle control equipment, and a power equipment, wherein, the vehicle motion equipment includes, but is not limited to, a speed sensor, an angle sensor, and an integrated navigation equipment;

the environment sensing equipment includes, but is not limited to, a lidar sensor, a millimeter wave radar sensor, an ultrasonic sensor, and a camera;

the vehicle control equipment includes, but is not limited to, a brake equipment, a steering equipment, an engine, a gearbox.

Exemplarily, if the first equipment to be detected is an engine, when the primary monitoring equipment detects that an operating parameter of the engine (such as, operating frequency, voltage, etc.) exceeds a preset value, an obtained detection result is that the operating parameter is abnormal; if the first equipment to be detected is a lidar sensor, when the primary monitoring equipment detects that the lidar sensor is not connected, an obtained detection result is that the connection state is abnormal; if the first equipment to be detected is a power equipment, when the primary monitoring equipment detects that the power of the power equipment is lower than a preset power, an obtained detection result is that the storage state of the power is abnormal; and if a log sequence of the first equipment to be detected is inconsistent with a normal log sequence of a preset scene, an obtained detection result is that the log sequence is abnormal.

S202: if the detection result indicates that the first equipment to be detected is abnormal, the primary monitoring equipment controls the vehicle to switch to a standby equipment of the first equipment to be detected to operate.

In this embodiment, if the primary monitoring equipment determines that the first equipment to be detected is abnormal according to the detection result, it sends a startup command to the standby equipment of the first equipment to be detected, to control the standby equipment to start.

Optionally, when the primary monitoring equipment determines that the first equipment to be detected is abnormal according to the detection result, it sends a fault repair instruction to the first equipment to be detected, wherein the fault repair instruction is used to instruct the first equipment to be detected to perform an equipment self-test and repair.

The vehicle control method provided by this embodiment of the present disclosure includes determining, by a primary monitoring equipment, a detection result of a first equipment to be detected, and if the detection result indicates that the first equipment to be detected is abnormal, controlling, by the primary monitoring equipment, the vehicle to switch to a standby equipment corresponding to the first equipment to be detected to operate. The above control method ensures that when an equipment of the vehicle is abnormal, the vehicle is switched to a standby equipment of the equipment in time, which greatly reduces an incidence of a safety accident caused by a failure of the equipment.

Based on the above embodiment, the following embodiments describe in detail how the primary monitoring equipment determines the detection result.

Figure 3:
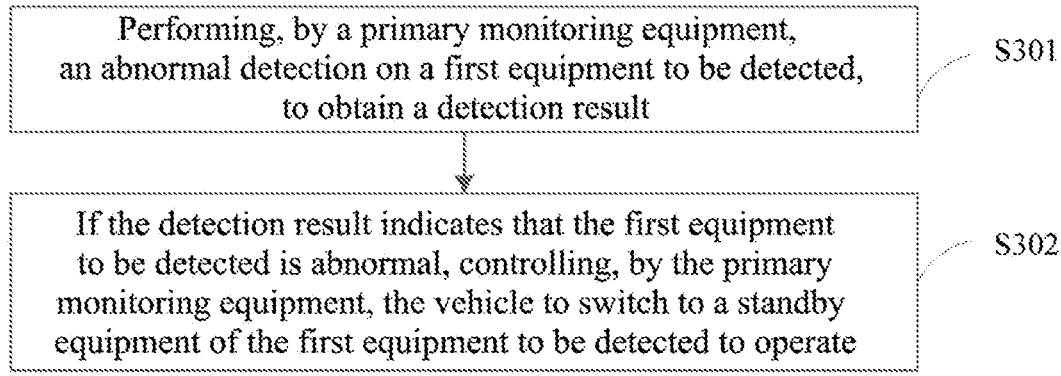
FIG. 3 is a schematic flow chart of a vehicle control method according to another embodiment of the present disclosure.

FIG. 3 is a schematic flowchart of a vehicle control method according to another embodiment of the present disclosure. As shown in FIG. 3, the vehicle control method provided in this embodiment includes the following steps:

S301: performing, by a primary monitoring equipment, an abnormal detection on a first equipment to be detected, to obtain a detection result.

Specifically, a first information processing unit of the primary monitoring equipment obtains equipment information of the first equipment to be detected, and determines whether the first equipment to be detected is abnormal according to the equipment information, and determines a detection result. The detection result includes an abnormal detection result and a normal detection result.

S302: if the detection result indicates that the first equipment to be detected is abnormal, controlling, by the primary monitoring equipment, the vehicle to switch to a standby equipment of the first equipment to be detected to operate.

If the detection result is the abnormal detection result, a first communication unit of the primary monitoring equipment sends a startup command to the standby equipment corresponding to the first equipment to be detected, and controls the standby equipment of the first equipment to be detected to start operation, completing the switching of the primary standby equipment.

In this embodiment, the primary monitoring equipment performs an abnormal detection on the first equipment to be detected, and if the detection result is an abnormal detection result, the control vehicle is controlled to switch to the standby equipment corresponding to the first equipment to be detected. A fault emergency response mechanism is realized, avoiding an immediate failure of the vehicle due to a faulty equipment.

Figure 4:
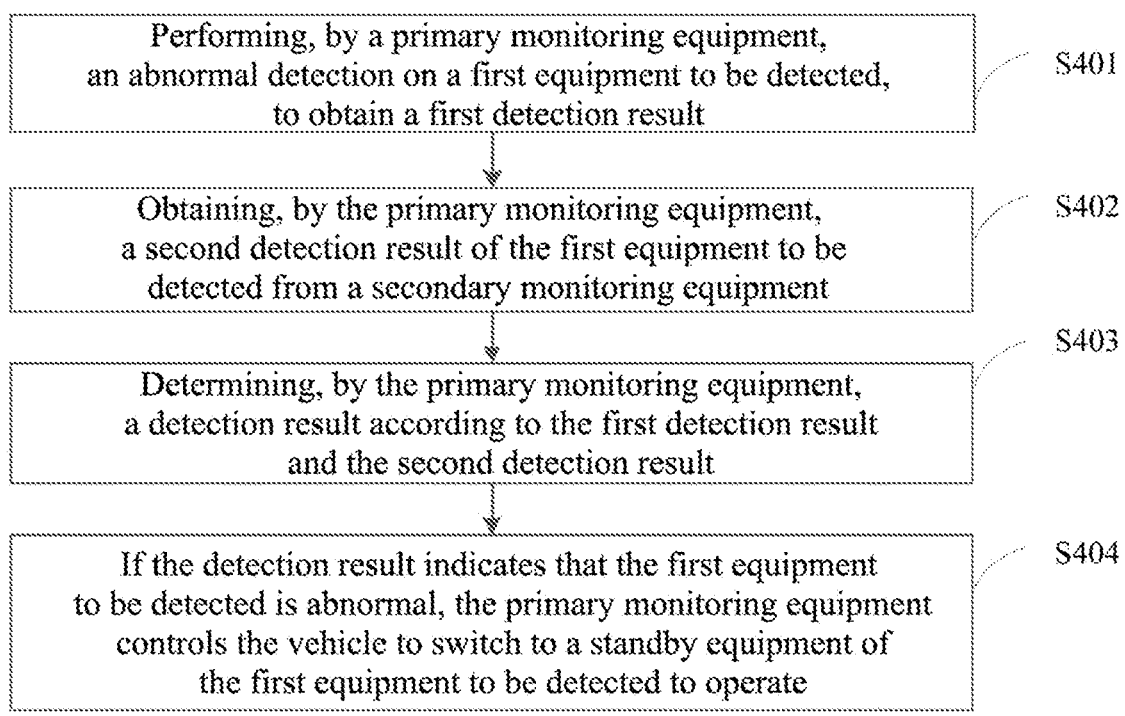
FIG. 4 is a schematic flow chart of a vehicle control method according to another embodiment of the present disclosure.

FIG. 4 is a schematic flow chart of a vehicle control method according to another embodiment of the present disclosure. As shown in FIG. 4, the vehicle control method provided in this embodiment includes the following steps:

S401: performing, by a primary monitoring equipment, an abnormal detection on a first equipment to be detected, to obtain a first detection result;

S402: obtaining, by the primary monitoring equipment, a second detection result of the first equipment to be detected from a secondary monitoring equipment;

In this embodiment, a first communication unit of the primary monitoring equipment receives the second detection result of the first equipment to be detected sent by a second communication unit of the secondary monitoring equipment, wherein, the second test result includes an abnormal detection result and a normal detection result. The second detection result may be the same as or different from the first detection result.

S403: determining, by the primary monitoring equipment, a detection result according to the first detection result and the second detection result;

Specifically, if the first detection result indicates that the first equipment to be detected is abnormal, and the second detection result indicates that the first equipment to be detected is abnormal, the first equipment to be detected is determined as abnormal;

if the first detection result indicates that the first equipment to be detected is abnormal, and the second detection result indicates that the first equipment to be detected is normal, the first equipment to be detected is determined as normal.

S404: if the detection result indicates that the first equipment to be detected is abnormal, the primary monitoring equipment controls the vehicle to switch to a standby equipment of the first equipment to be detected to operate.

S401 and S404 in this embodiment have the same principles and technical effects as S301 and S302 in the foregoing embodiment, respectively, and details may be found in the foregoing embodiment, and details are not described here again.

In this embodiment, the primary monitoring equipment obtains a comprehensive detection result according to the first detection result of the first equipment to be detected obtained by the primary monitoring equipment itself and the second detection result of the first equipment to be detected sent by the secondary monitoring equipment, and if the comprehensive detection result is an abnormal detection result, the vehicle is controlled to switch to the standby equipment corresponding to the first equipment to be detected to operate. The above determining process integrates the detection results of the primary monitoring equipment and the secondary monitoring equipment, avoiding an unnecessary equipment switching caused by misjudgment of the primary monitoring equipment, and improving the accuracy of the system emergency response mechanism.

Figure 5:
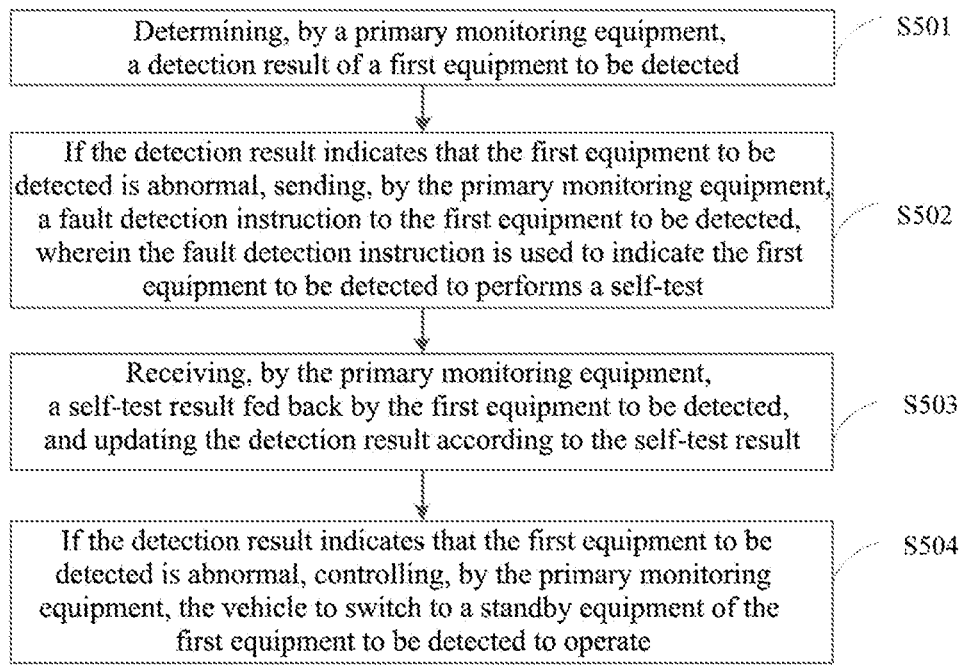
FIG. 5 is a schematic flow chart of a vehicle control method according to still another embodiment of the present disclosure.

FIG. 5 is a schematic flowchart of a vehicle control method according to still another embodiment of the present disclosure. As shown in FIG. 5, the vehicle control method provided in this embodiment includes the following steps:

S501: determining, by a primary monitoring equipment, a detection result of a first equipment to be detected;

In this embodiment, a first information processing unit of the primary monitoring equipment obtains equipment information of the first equipment to be detected, and determines whether the first equipment to be detected is abnormal according to the equipment information, and then determines the detection result, Alternatively, the first information processing unit of the primary monitoring equipment determines the detection result according to a first detection result of the first detection equipment determined by the first information processing unit itself and a second detection result of the first equipment to be detected sent by a secondary monitoring equipment.

The above detection result includes an abnormal detection result and a normal detection result.

S502: if the detection result indicates that the first equipment to be detected is abnormal, sending, by the primary monitoring equipment, a fault detection instruction to the first equipment to be detected, wherein the fault detection instruction is used to indicate the first equipment to be detected to performs a self-test;

S503: receiving, by the primary monitoring equipment, a self-test result fed back by the first equipment to be detected, and updating the detection result according to the self-test result;

In this embodiment, if the detection result is an abnormal detection result, the primary monitoring equipment sends a failure detection instruction to the first equipment to be detected, and if the self-test result obtained by the self-test of the first equipment to be detected is normal, the self-test result is used as the detection result in S501, and an equipment switching is not performed; if the self-test result obtained by the self-test of the first equipment to be detected is still abnormal, then S504 is performed.

S504: if the detection result indicates that the first equipment to be detected is abnormal, controlling, by the primary monitoring equipment, the vehicle to switch to a standby equipment of the first equipment to be detected to operate.

S504 in this embodiment has the same principle and the technical effect as S302 in the foregoing embodiment, and details can be found in the foregoing embodiment, and details are not described here again.

In this embodiment, after determining that the comprehensive detection result of the first equipment to be detected is an abnormal detection result according to the first detection result and the second detection result, the primary monitoring equipment sends a failure self-test instruction to the first equipment to be detected, and if the returned self-test result is still abnormal, then the vehicle is controlled to switch to the standby equipment corresponding to the first equipment to be detected; if the returned self-test result is normal, an equipment switching is not performed. Through the above determining process, the primary monitoring equipment, the secondary monitoring equipment and a self-test device of the first equipment to be detected are combined to obtain the detection result, avoiding an unnecessary equipment switching, and improving the accuracy and flexibility of the system fault emergency response mechanism.

Figure 6:
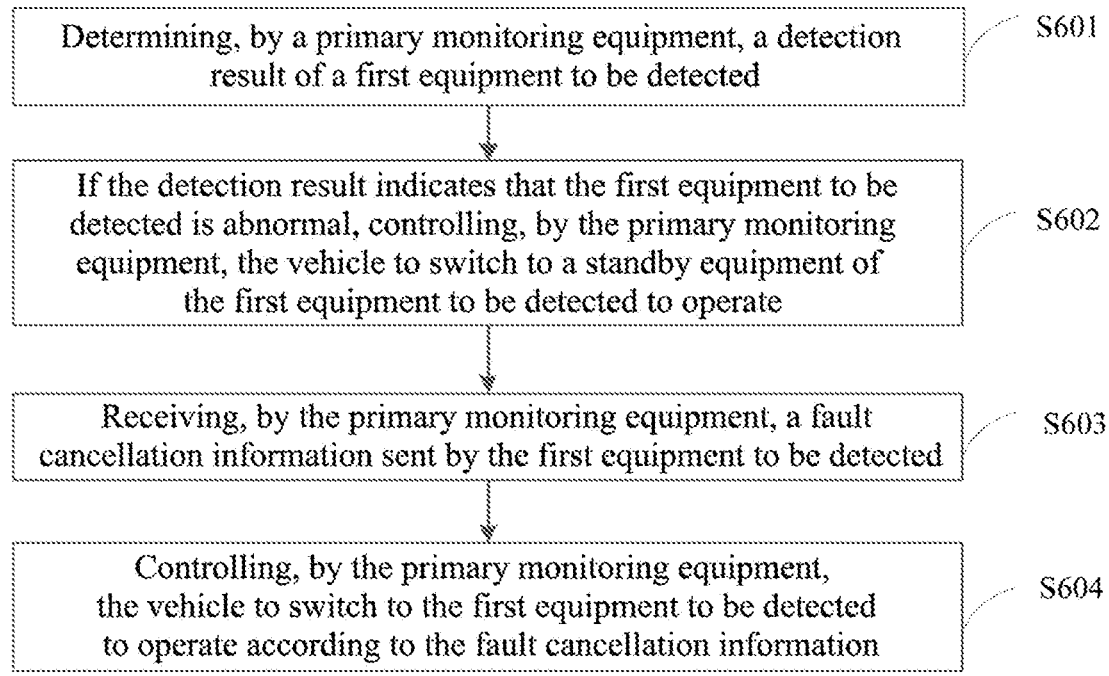
FIG. 6 is a schematic flow chart of a vehicle control method according to still another embodiment of the present disclosure.

FIG. 6 is a schematic flowchart of a vehicle control method according to still another embodiment of the present disclosure. On the basis of the above embodiments, the vehicle control method provided in this embodiment describes a fault recovery mechanism in detail.

As shown in FIG. 6, the vehicle control method provided in this embodiment includes the following steps:

S601: determining, by a primary monitoring equipment, a detection result of a first equipment to be detected;

S602: if the detection result indicates that the first equipment to be detected is abnormal, controlling, by the primary monitoring equipment, the vehicle to switch to a standby equipment of the first equipment to be detected to operate;

S601 and S602 in this embodiment have the same implementation principles and technical effects as the foregoing embodiments, and details can refer to the foregoing embodiments, and details are not described here again.

S603: receiving, by the primary monitoring equipment, a fault cancellation information sent by the first equipment to be detected;

In this embodiment, after the vehicle is switched to the standby equipment of the first equipment to be detected, the primary monitoring equipment sends a fault repair instruction to the first equipment to be detected, wherein the fault repair instruction is used to instruct the first equipment to be detected to perform an equipment self-test and repair.

The first equipment to be detected performs the equipment self-test and repair according to the fault repair instruction sent by the primary monitoring equipment, and if the fault is removed, the first equipment to be detected sends fault cancellation information to the primary monitoring equipment.

S604: controlling, by the primary monitoring equipment, the vehicle to switch to the first equipment to be detected to operate according to the fault cancellation information.

The primary monitoring equipment sends a shutdown instruction to the standby equipment of the first equipment to be detected according to the fault cancellation information, and controls the standby equipment to stop operating. At the same time, the primary monitoring equipment sends a startup instruction to the first equipment to be detected and controls the first equipment to be detected to start operating.

In this embodiment, the primary monitoring equipment controls the vehicle to switch back to the primary equipment according to the fault cancellation information sent by the first equipment to be detected, realizing a self-starting mechanism of the primary equipment of the vehicle after fault repair, and improving the automatic control function of the system.

Figure 7:
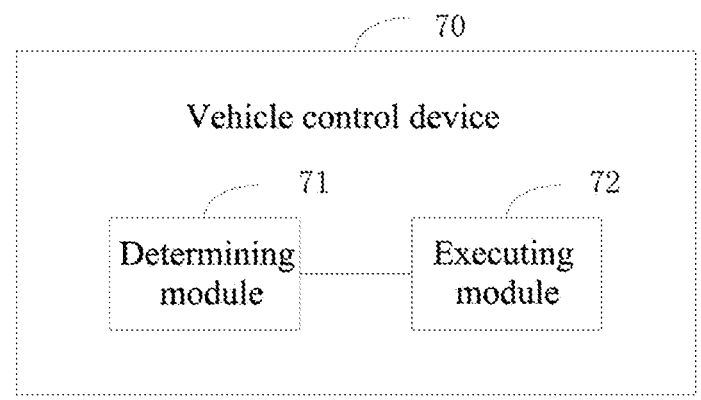
FIG. 7 is a schematic structural diagram of a vehicle control device according to an embodiment of the present disclosure.

An embodiment of the present disclosure further provides a vehicle control device, referring to FIG. 7. The embodiment of the present disclosure is illustrated only by FIG. 7 as an example, and the present disclosure is not limited thereto.

FIG. 7 is a schematic structural diagram of a vehicle control device according to an embodiment of the present disclosure. As shown in FIG. 7, this embodiment provides a vehicle control device 70, including:

a determining module 71 configured to determine a detection result of a first equipment to be detected; and an executing module 72 configured to control the vehicle to switch to a standby equipment of the first equipment to be detected to operate if the detection result indicates that the first equipment to be detected is abnormal.

Optionally, the determining module 71 is specifically configured to perform an abnormal detection on the first equipment to be detected to obtain the detection result.

The vehicle control device provided by the embodiment of the present disclosure includes a determining module and an executing module, wherein the determining module is configured to determine the detection result of the first equipment to be detected, and if the detection result indicates that the first equipment to be detected is abnormal, the executing module is configured to control the vehicle to switch to the standby equipment corresponding to the first equipment to be detected to operate. The above vehicle control device ensures that when an equipment of the vehicle is abnormal, the vehicle is switched to a standby equipment of the equipment in time, which greatly reduces an incidence of a safety accident caused by a failure of the equipment.

Figure 8:
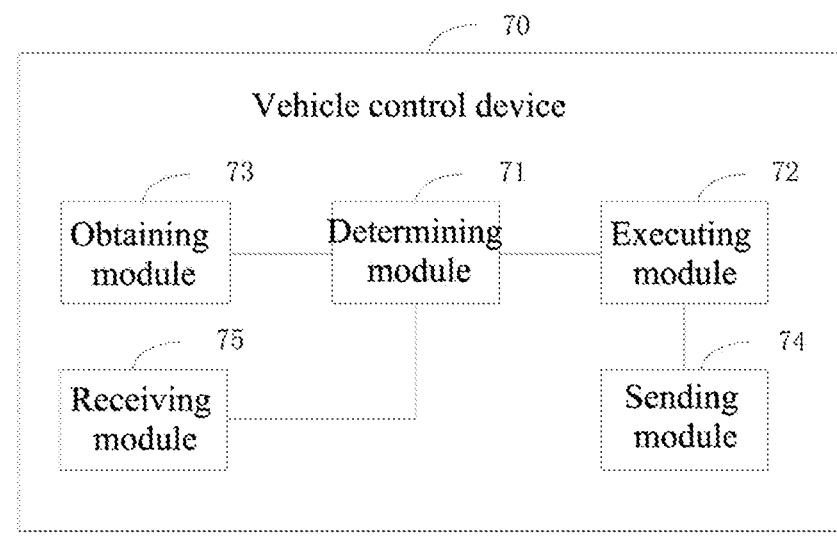
FIG. 8 is a schematic structural diagram of a vehicle control device according to another embodiment of the present disclosure.

FIG. 8 is a schematic structural diagram of a vehicle control device according to another embodiment of the present disclosure. On the basis of the device shown in FIG. 7, the vehicle control device 70 provided in this embodiment as shown in FIG. 8 further includes:

an obtaining module 73 configured to perform an abnormal detection on the first equipment to be detected to obtain a first detection result;

the obtaining module 73 is further configured to obtain a second detection result of the first equipment to be detected from a secondary monitoring equipment; and the determining module 71 is specifically configured to determine a detection result according to the first detection result and the second detection result.

Optionally, the vehicle control device 70 further includes:

a sending module 74 configured to send a fault detection instruction to the first equipment to be detected if the detection result indicates that the first equipment to be detected is abnormal, wherein the fault detection instruction is used to instruct the first equipment to be detected to perform a self-test;

a receiving module 75 configured to receive a self-test result fed back by the first equipment to be detected, and the determining module is further configured to update the detection result according to the self-test result.

Optionally, the determining module 71 is specifically configured to:

if the first detection result indicates that the first equipment to be detected is abnormal, and the second detection result indicates that the first equipment to be detected is abnormal, determine that the first equipment to be detected is abnormal; and if the first detection result indicates that the first equipment to be detected is abnormal, and the second detection result indicates that the first equipment to be detected is normal, determine that the first equipment to be detected is normal.

Optionally, the executing module 72 is specifically configured to:

send a startup instruction to the standby equipment of the first equipment to be detected, and control the standby equipment to start.

Optionally, the detection result includes at least one of an operating parameter, a connection state, a storage state, and a log sequence of the first equipment to be detected.

Optionally, the vehicle control device 70 further includes:

a receiving module 75 configured to receive a fault cancellation information sent by the first equipment to be detected;

the executing module 72 is further configured to control the vehicle to switch to the first equipment to be detected to operate according to the fault cancellation information.

The vehicle control device provided in this embodiment can perform the technical solution of the foregoing method embodiment, and its implementation principle and technical effect are similar to the latter, and details are not described here again.

Figure 9:
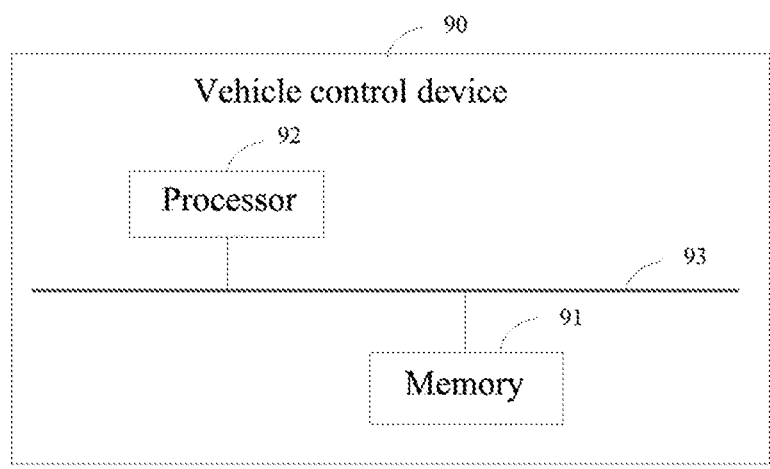
FIG. 9 is a schematic structural diagram of a hardware of a vehicle control device according to an embodiment of the present disclosure.

An embodiment of the present disclosure further provides a vehicle control device, referring to FIG. 9. This embodiment of the present disclosure is illustrated only by FIG. 9 as an example, and the present disclosure is not limited thereto.

FIG. 9 is a schematic structural diagram of hardware of a vehicle control device according to an embodiment of the present disclosure. As shown in FIG. 9, this embodiment provides a vehicle control device 90, including:

a memory 91;

a processor 92; and a computer program;

wherein the computer program is stored in the memory 91 and is configured to be executed by the processor 92 to implement the technical solution of any one of the foregoing method embodiments, and its implementation principle and technical effect are similar to the latter, and will not be described here again.

Optionally, the memory 91 can be either independent or integrated with the processor 92.

When the memory 91 is a device independent of the processor 92, the vehicle control device 90 also includes:

a bus 93 for connecting the memory 91 and the processor 92.

An embodiment of the present disclosure also provides a computer readable storage medium having a computer program stored thereon that, being executed by the processor 92, implements various steps performed by the vehicle control device 90 in the method embodiment above.

It should be understood that the above processor may be a central processing unit (CPU), and may also be other general purpose processor, digital signal processor (DSP), application specific integrated circuit (ASIC), etc. The general purpose processor may be a microprocessor, or any conventional processor, etc. The steps of the method disclosed in connection with the present disclosure may be directly implemented by an execution of a hardware processor or by a combination of hardware and software modules in the processor.

The memory may contain high speed RAM memory and may also include non-volatile memory NVM, such as at least one disk storage, can also be a U disk, a mobile hard disk, a read-only memory, a magnetic disk or an optical disk, etc.

The bus can be an Industry Standard Architecture (ISA) bus, a peripheral component interconnect (PCI) bus, or an extended industry standard architecture (ESA) bus, etc. The bus can be divided into an address bus, a data bus, a control bus, etc. For ease of representation, the bus in the drawings of the present application does not be limited to only one bus or one type of bus.

The above storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only Memory (ROM), a magnetic memory, a flash memory, a magnetic disk or an optical disk. The storage medium can be any available media that can be accessed by a general purpose or special purpose computer.

An exemplary storage medium is coupled to a processor to enable the processor to read information from, and write information to, the storage medium. Of course, the storage medium can also be part of the processor. The processor and the storage medium may be located in an application specific integrated circuit (ASIC). Of course, the processor and the storage medium can also exist as discrete components in an electronic device or a master device.

Finally, it should be noted that the above embodiments are only used to illustrate technical solutions of the present disclosure, and are not to be limiting; although the present disclosure has been described in detail with reference to the foregoing embodiments, those skilled in the art should understand that the technical solutions described in the foregoing embodiments may be modified or some or all of the technical features therein may be equivalently substituted; and these modifications or substitutions do not make the essence of corresponding technical solutions deviate from the scope of the technical solutions of the embodiments of the present disclosure.

What is claimed is:

1. An automatic driving system, comprising: a primary monitoring equipment, a secondary monitoring equipment, at least one equipment to be detected, and a standby equipment corresponding to each equipment to be detected;
the primary monitoring equipment and the secondary monitoring equipment are connected to each equipment to be detected respectively, and the primary monitoring equipment and the secondary monitoring equipment are connected to the standby equipment corresponding to each equipment to be detected respectively;
the primary monitoring equipment is connected to the secondary monitoring equipment, and the primary monitoring equipment is configured to perform an abnormality detection on a first equipment to be detected to obtain a first detection result obtain a second detection result of the first equipment to be detected from the secondary monitoring equipment determine a detection result according to the first detection result and the second detection result, and control a vehicle to switch between the first equipment to be detected and the standby equipment corresponding to the first equipment to be detected according to the detection result.

2. The system according to claim 1, wherein the at least one equipment to be detected comprises at least one of: a vehicle motion equipment, an environment sensing equipment, a vehicle control equipment, or a power equipment.

3. The system according to claim 2, wherein the vehicle motion equipment comprises at least one of: a speed sensor, an angle sensor, and an integrated navigation equipment.

4. The system according to claim 2, wherein the environment sensing equipment comprises at least one of: a lidar sensor, a millimeter wave radar sensor, an ultrasonic sensor, and a camera.

5. The system according to claim 2, wherein the vehicle control equipment comprises at least one of: a brake equipment, a steering equipment, an engine, and a gearbox.

6. The system according to claim 1, wherein the detection result comprises at least one of an operating parameter, a connection state, a storage state, and a log sequence of the first equipment to be detected.

7. A vehicle control method, comprising:
performing, by a primary monitoring equipment, an abnormality detection on a first equipment to be detected to obtain a first detection result;
obtaining, by the primary monitoring equipment, a second detection result of the first equipment to be detected from a secondary monitoring equipment; and
determining, by the primary monitoring equipment, a detection result according to the first detection result and the second detection result; and if the detection result indicates that the first equipment to be detected is abnormal, controlling, by the primary monitoring equipment, a vehicle to switch operation to a standby equipment of the first equipment to be detected.

8. The method according to claim 7, further comprising:
if the detection result indicates that the first equipment to be detected is abnormal, sending, by the primary monitoring equipment, a fault detection instruction to the first equipment to be detected, wherein the fault detection instruction is used to instruct the first equipment to be detected to perform a self-test;
receiving, by the primary monitoring equipment, a self-test result fed back by the first equipment to be detected, and updating the detection result according to the self-test result.

9. The method according to claim 7, wherein the determining, by the primary monitoring equipment, the detection result according to the first detection result and the second detection result, comprises:
if the first detection result indicates that the first equipment to be detected is abnormal, and the second detection result indicates that the first equipment to be detected is abnormal, determining that the first equipment to be detected is abnormal; and
if the first detection result indicates that the first equipment to be detected is abnormal, and the second detection result indicates that the first equipment to be detected is normal, determining that the first equipment to be detected is normal.

10. The method according to claim 7, wherein the controlling, by the primary monitoring equipment, the vehicle to switch to the standby equipment of the first equipment to be detected to operate, comprises:
sending, by the primary monitoring equipment, a startup command to the standby equipment of the first equipment to be detected, and controlling the standby equipment to start.

11. The method according to claim 7, wherein the detection result comprises at least one of an operating parameter, a connection state, a storage state, and a log sequence of the first equipment to be detected.

12. The method according to claim 7, further comprising:
receiving, by the primary monitoring equipment, a fault cancellation information sent by the first equipment to be detected; and
controlling, by the primary monitoring equipment, the vehicle to switch operation to the first equipment to be detected to operate according to the fault cancellation information.

13. A vehicle control device, a processor, and a non-transitory computer readable medium for storing program codes, which, when executed by the processor, cause the processor to:
perform an abnormality detection on a first equipment to be detected, to obtain a first detection result;
obtain a second detection result of the first equipment to be detected from a secondary monitoring equipment; and
determine a detection result according to the first detection result and the second detection result; and
if the detection result indicates that the first equipment to be detected is abnormal, control a vehicle to switch operation to a standby equipment of the first equipment to be detected to operate.

14. The device according to claim 13, wherein the program codes further cause the processor to:
send a fault detection instruction to the first equipment to be detected if the detection result indicates that the first equipment to be detected is abnormal, wherein the fault detection instruction is used to instruct the first equipment to be detected to perform a self-test; and receive a self-test result fed back by the first equipment to be detected, and update the detection result according to the self-test result.

15. The device according to claim 13, wherein when the program codes cause the processor to determine the detection result according to the first detection result and the second detection result, the program codes cause the processor specifically to:
if the first detection result indicates that the first equipment to be detected is abnormal, and the second detection result indicates that the first equipment to be detected is abnormal, determine that the first equipment to be detected is abnormal; and
if the first detection result indicates that the first equipment to be detected is abnormal, and the second detection result indicates that the first equipment to be detected is normal, determine that the first equipment to be detected is normal.

16. The device according to claim 13, wherein, when the program codes cause the processor to, if the detection result indicates that the first equipment to be detected is abnormal, control the vehicle to switch to the standby equipment of the first equipment to be detected to operate, the program codes cause the processor specifically to:
send a startup instruction to the standby equipment of the first equipment to be detected, and control the standby equipment to start.

17. The device according to claim 13, wherein the detection result comprises at least one of an operating parameter, a connection state, a storage state, and a log sequence of the first equipment to be detected.

18. The device according to claim 13, wherein the program codes further cause the processor to:
receive a fault cancellation information sent by the first equipment to be detected;
when the program codes cause the processor to, if the detection result indicates that the first equipment to be detected is abnormal, control the vehicle to switch to the standby equipment of the first equipment to be detected to operate, the program codes further cause the processor to: control the vehicle to switch to the first equipment to be detected to operate according to the fault cancellation information.

19. A vehicle control device, comprising:
a non-transitory memory;
a processor; and
a computer program;
wherein the computer program is stored in the memory and is configured to be executed by the processor to implement the method according to claim 7.

20. A non-transitory computer readable storage medium having stored thereon a computer program that, when being executed by a processor, implements the method according to claim 7.

* * * * *